ced, are sheared off. However, experience has taught

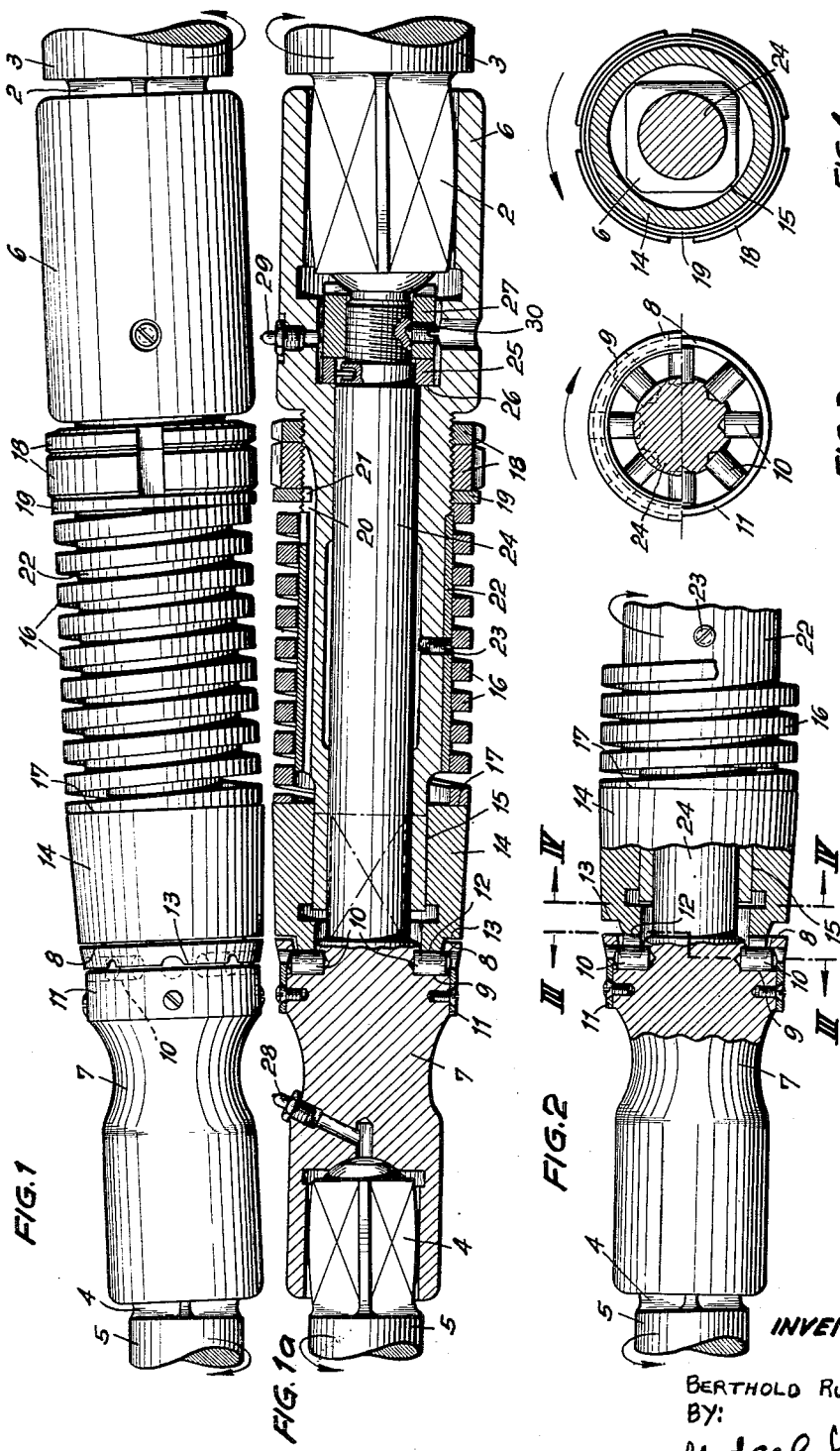

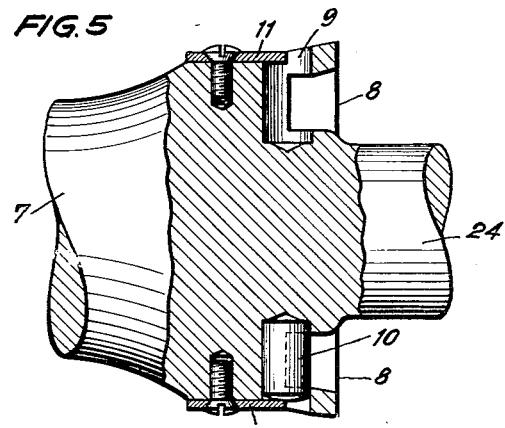
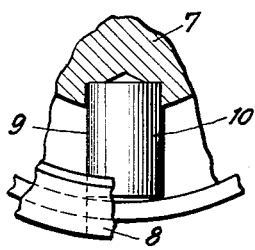
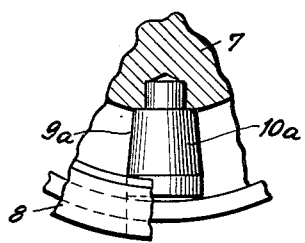
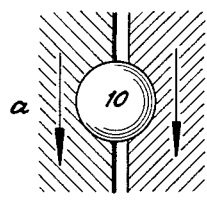
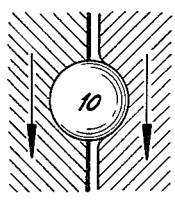
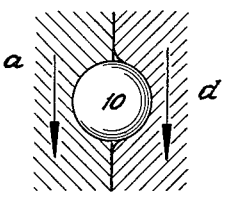
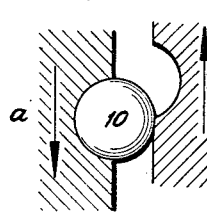
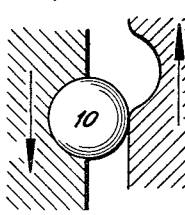
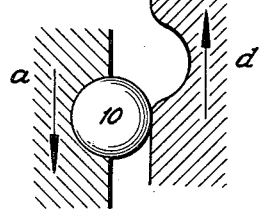

United States Patent Office 2,760,361
Patented Aug. 28, 1956

2,760,361

OVERLOAD COUPLINGS

Berthold Rüthinger, Pforzheim, Germany, assignor to Karl Wezel, a firm

Application November 18, 1952, Serial No. 321,074

4 Claims. (Cl. 64—29)

The present invention relates to overload couplings, and is especially directed to a coupling provided with a safety clutch which is particularly suited for use in the driving shafts employed in rolling mills.

When the press-rollers of rolling plants, for instance four- or six-roller rolling plants, are in operation, there frequently occurs because of too strong a reduction in cross-section a jamming of the material to be rolled, which easily may result in undue torsional strain on the rollers and breaking of the latter if no precautions are taken.

That is why it has already been the practice to arrange in the driving shafts of rolling plants so-called safety bolts which, when the permissible torsional strain is exceeded, are sheared off. However, experience has taught that the arrangement of new bolts in the driving shafts takes up a comparatively long time, and that during this time the workmen are idle and no work is done.

Instead of employing the aforesaid safety bolts, it has also been tried to arrange in the driving shafts between the actuating gearing and the rollers, safety couplings which in case of overloading automatically become disengaged. Known couplings of this kind consist of a spring-pressed claw-rim provided with slide-surfaces and adapted for engagement in a cooperating coupling rim. In constructions of this type there occurs during the disengaging movement a sliding surface friction, which requires a large disengaging area, that is to say, a considerable allowance regarding the overload limit to be adjusted. In addition to that the radial dimensions of these known couplings are too large, as naturally the diameter of the couplings has to be in accord with the diameter of the rollers and the distance between them. Furthermore, it is desirable that the disengagement takes place at an accurately predetermined torsional strain.

The disadvantages of the known constructions are overcome by the present invention, which is characterized by the feature that in the coupling-rim cooperating with the claw-rim rolls are arranged which are radially positioned in the rim and partly embraced by the displaceable claw-rim, so that during the displacing of the claw-rim rolling friction with line contact occurs. An arrangement like this permits in combination with additional inventive features, which will hereafter be described, an accurate adjustment of the disengaging range.

The rolls may be of cylindrical or conical shape. They may be arranged in radially extending recesses of the cooperating coupling-rim formed by the shoulder of a coupling part. The radially extending recesses may be formed by laterally open bores which on their outside are closed up by a covering sleeve. If cylindrical rolls are used, the bores are of correspondingly cylindrical shape. If concial rolls are employed, the rolls should preferably be cone-shaped only in their area of action and protected against radical displacement by cylindrical supporting journals.

The coupling member provided with the claw-rim may be shiftably positioned on a multi-edged portion of the other coupling part for displacement against the pressure of a spring, and may be constructed in such a way that the claw-rim embraces at the most half of the circumference of the aforesaid cylindrical or conical rolls. If the claw-rim is devised like this it will be enabled to pass, while rotating the rolls, slidingly over them, as soon as the turning moment to be transmitted is in excess of the normal. The portions of the claw-rim embracing the rolls may further be provided with bevelled or rounded shoulders, whereby the resistance to wear of the coupling will be considerably augmented.

For the adjustment of the axial pressure of the spring which is bearing against the rear end of the coupling member provided with the claw-rim, an annular nut may be used, which preferably may be secured in position by a counternut. In addition to that, an exchangeable sleeve may be arranged between the aforesaid spring and the portion of the coupling part surrounded by it. It will be seen that in a construction like this the spring pressure controlling the disengaging action in case of overloading, can be regulated not only through shortening of the accommodation area of the spring, but also through substitution of the spring by a stronger one, that is to say, by a spring of larger cross-section. The provision of the annular nut further makes it possible to adjust the couplings of a rolling plant in such a way that harmonious working of the couplings is guaranteed.

In order to obtain that the coupling parts are forming an undivided entirety, the invention contemplates to provide the coupling part having the aforesaid shoulder with an offset shaft, and to devise the other coupling part carrying the coupling member provided with the claw-rim as an interiorly hollow shaft into which the aforesaid offset shaft extends and in which it is supported in position by means of an annular supporting member bearing against an inner annular shoulder formed by an enlargement of the hollow interior of the shaft, said annular supporting member being secured in position by a nut screwed onto the threaded end of the offset shaft.

While I have described my invention as taking a particular form, it will be understood that the various parts may be changed without departure from the spirit of the invention, and hence I do not limit myself to the precise construction set forth, but consider that I am at liberty to make such changes and alterations as fairly come within the scope of the appended claims.

My invention will be best understood from a consideration of the following detailed description taken in connection with the accompanying drawings forming a part of this specification, and in which corresponding parts are referred to by the same reference numerals in all of the several views.

In the drawings:

Fig. 1 is a side elevation of an overload coupling fastened to the journal-end of one of the press rollers of a rolling plant;

Fig. 1a is a central longitudinal section of the overload coupling of Fig. 1;

Fig. 2 is a side elevation, partly in section, of the coupling means of the overload coupling of Figs. 1 and 1a, showing the claw-rim in disengaged position because of overloading;

Fig. 3 is a vertical cross-section on line III—III of Fig. 2, showing the radial arrangement of the cylindrical rolls in the shoulder of the one of the coupling parts;

Fig. 4 is a vertical cross-section on line IV—IV of Fig. 2, showing how the coupling member provided with the claw-rim is guided on a multi-edged portion of one of the coupling parts;

Figs. 5 to 7 are detail views, showing the arrangement of the cylindrical or conical transmitting means in the shoulder of one of the coupling parts;

Figs. 8 to 13 are diagrammatical illustrations of various forms of construction of the power transmitting elements of the coupling, in transmitting position and in disengaged position because of overloading.

Referring now to the drawings in detail, the reference numeral 2 designates the ends of the journals 3 of a reducing gear for the actuation of the rollers. The journal ends 2 as well as the journal ends 4 of the driven press rollers 5 are four-edged and in customary manner convexly shaped, as shown in the construction illustrated in Figs. 1 and 1a. Heretofore the four-edged journal ends 2 and 4 were connected with each other by means of driving shafts which for that purpose were provided with suitable recesses at their ends. In this way the alterations of the planes of the axes of rotation resulting from the necessary adjustment in height of the press-rollers were compensated for. The herein disclosed coupling now takes the place of the aforesaid driving shaft, and, in addition to compensating for the differences in the planes of the axes of rotation, also effects the automatic interruption of the transmission of power, that is to say, of the transmission of the turning moment, in case of overloading.

From an inspection of the embodiment illustrated in Figs. 1 and 1a it will be seen that upon the four-edged journal-ends 2 on the driving side of the construction an interiorly hollow shaft-like coupling part 6 has been mounted, which on the driven side of the construction is coupled to a coupling part 7 pushed onto the four-edged journal-ends 4 of the press-rollers 5 to be driven.

The coupling part 7 on the driven side of the construction is provided with a shoulder 8 having radially arranged therein a plurality of laterally open bores 9 adapted to receive a corresponding number of cylinder rolls 10. The bores 9 are closed up on the outside by a covering sleeve 11 pushed onto the coupling part 7. The cylinder rolls 10 engage with the free portions of their cross-sections partly in recesses 12 provided in the claw-rim 13 of a coupling member 14 which is shiftably, but not rotatably mounted on the multi-edged guide surface 15 of the coupling part 6 for displacement on that coupling part 6 against the resistance of the pressure spring 16. The pressure spring 16 is at one end bearing against the rear end 17 of the coupling member 14, and at its other end, against an annular stop member 19 which is adjustably secured in position with the aid of the annular nut and counternut 18. Rotation of the annular stop member 19 is prevented by means of the projection 21 engaging in a groove 20 in the coupling part 6. The nuts 18 serve as a means for fine adjustment of the disengaging turning moment. Interposed between the outer surface of the coupling part 6 and the pressure spring 16 is an exchangeable sleeve 22, enabling the use of pressure springs of different strength for the rough adjustment of the disengaging turning moment. The sleeve 22 is secured in position by means of the fixing screw 23.

The coupling part 7, positioned on the driven side of the construction, is provided with an offset shaft 24 extending into the hollow interior of the coupling part 6 and having its free end secured in the coupling part 6 by means of an annular supporting member 25 bearing against an inner annular shoulder 26 formed by an enlargement of the hollow interior of the coupling part 6. The annular supporting member 25 is provided with means for preventing its rotational displacement and is secured in position within the enlarged hollow interior of the coupling part 6 by the nut 27 screwed onto the threaded end of the shaft 24. The nut 27 is provided with a threaded transverse bore and a locking means in form of a set screw 30 is screwed into the bore. Set screw 30 presses with its inner end against the threaded portion of the shaft 24 to fix the nut 27 on the shaft and to prevent loosening of the nut. It will be seen that a coupling of this kind can be produced and arranged in operating position as an undivided entirety.

The lubrication nipples 28 and 29 serve as a means for lubricating the parts which are in frictional contact with each other.

As soon as the driving moment to be transmitted from the journals 3 of the actuating gearing to the press rollers 5 exceeds (for instance because of too strong a reduction in cross-section of the material to be rolled) the permissible moment of transmission in accord with the diameter of the coupling member 13, 14, the strength of the pressure spring 16, the diameter of the cylinder rolls 10 and the volume of the portion of the cylinder rolls 10 embraced by the claw-rim 13, then the coupling is put into action. As indicated in Fig. 2, the coupling member 13, 14 then moves along on the four-edged guide surface 15 of the coupling part 6 toward the right against the pressure of the spring 16 and slidingly passes, in rattle-like manner, over the cylinder rolls 10 rotating in the laterally open bores 9. In this way it is accomplished that the actuating gearing and the coupling part 6 may continue to work at a predetermined transmissible maximum moment while the coupling part 7 and the press-rollers are standing still. The actuating means may then be stopped temporarily in order to be started again as soon as the obstacle, for instance jamming of the goods to be rolled, has been taken care of.

Fig. 5 is another illustration, on an enlarged scale, of the coupling part 7, showing the shoulder 8 provided with the bores 9 and the cylinder rolls 10 supported in the bores 9. It will be noticed that only on one side of the coupling part a roll 10 has been arranged in a bore 9, so that on the other side of the part the laterally open bore 9, which is partly covered up by the sleeve 11, is clearly discernible. Instead of arranging cylindrical rolls 10 in cylindrical bores 9 (Fig. 6) it is also possible to arrange conical rolls 10a in bores of corresponding shape 9a, whereby the conical rolls 10a should, in order to avoid radial displacement, preferably be provided with cylindrical supporting journals. For disengaging purposes the cone-shaped rolls are of course better suited than the cylindrical rolls, but, on the other hand, the manufacture of conical rolls is more expensive than that of cylindrical ones.

The diagrammatical illustrations of Figs. 8 to 13 show in Figs. 8 and 9 the shoulder bearing $a$ of a roll 10 in cooperation with a claw-shoulder $b$, which is embracing less than half of the circumference of the roll, before and during the disengaging action. In Figs. 10 and 11 the shoulder bearing $a$ of the roll 10 corresponds to that of the preceding figures, while the claw-shoulder $c$ is provided with rounded corners. In Figs. 12 and 13 the claw-shoulder $d$ is likewise provided with rounded corners, but, differently from the claw-shoulders of Figs. 8 to 11, embraces half of the circumference of the roll 10.

What I claim as new and desire to secure by Letters Patent of the United States is:

1. An overload coupling particularly for use in rolling plants comprising, in combination, a first coupling part having one end adapted to be fastened on the journal end of a press roller and provided at its opposite end with an annular shoulder, and with a cylindrical shaft projecting from the center of said annular shoulder and having a free end provided with a thread, said first coupling part being formed with a plurality of recesses radially arranged in said annular shoulder around said shaft; a plurality of coupling rollers rotatably mounted in said plurality of recesses and projecting therefrom with approximately half of the cross-section thereof; means for retaining said coupling rollers within said recesses; a second coupling part of hollow tubular formation having an axial bore receiving said shaft and an enlarged hollow portion forming an inner shoulder in said second coupling part, said second coupling part being adapted to be fastened at one end thereof on the journal end of an actuating gearing and having another end facing said coupling rollers with a guide surface; an annular supporting member located in said enlarged hollow portion of said second coupling part and being fixedly mounted about said cylindrical shaft for rotation therewith, said supporting member having a pair of annular faces, one of said annular faces abutting against said inner shoulder; an annular nut located in said enlarged hollow portion and being screwed onto said threaded free end of said shaft and abutting against the other annular face of said supporting member so as to connect said first and second coupling parts non-movable in axial direction away from each other and rotatable relative to each other; a coupling member provided at the forward end thereof with a claw rim and being mounted on said guide surface of said second coupling part shiftable in axial direction for cooperation of its claw rim with said coupling rollers; and a helical spring surrounding said second coupling part and engaging the rear end of said coupling member for urging said claw rim into coupling engagement with said coupling rollers.

2. An overload coupling as claimed in claim 4 and including locking means engaging said threaded free end of said shaft and said nut for holding the same in position.

3. An overload coupling particularly for use in rolling plants and comprising, in combination, a first rotary coupling part having a projecting shaft end portion, said first coupling part having an annular face formed with an annular recess, said first coupling part being formed with a plurality of radially extending bores, each bore communicating with said annular recess; frusto-conical coupling rollers turnably mounted in said radially extending bores and projecting into said recess; a sleeve slidably mounted on the outer surface of said first coupling part and closing said radially extending bores for retaining said rollers; means securing said sleeve to said first coupling part; a second rotary coupling part having a cylindrical axially extending bore rotatably supporting said shaft end portion; attaching means secured to said shaft end portion located in said bore of said second coupling part and engaging said second coupling part so as to prevent sliding of said coupling parts in axial direction away from each other; an annular coupling member mounted on the outer surface of said second coupling part slidable in an axial direction but non-rotatable relative thereto, said annular coupling member having a rim projecting into said annular recess of said first coupling part and being formed with recesses; and spring means mounted on said second coupling part engaging the same and said coupling member and urging the same in axial direction toward said annular face of said first coupling part so that said recesses in said rim embrace said rollers and connect said coupling parts for rotation, while said coupling rollers urge said coupling member in an opposite axial direction when the transmitted torque exceeds a predetermined limit whereby said coupling parts are disconnected for relative rotation.

4. An overload coupling particularly for use in rolling plants and comprising, in combination, a first rotary coupling part having a projecting shaft end portion having a threaded free end portion, said first coupling part having an annular face formed with an annular recess, said first coupling part being formed with a plurality of radially extending bores, each bore communicating with said annular recess; coupling rollers turnably mounted in said radially extending bores and projecting into said recess; a sleeve mounted on the outer surface of said first coupling part and closing said radially extending bores for retaining said rollers; means securing said sleeve to said first coupling part; a second rotary coupling part having a cylindrical axially extending bore rotatably supporting said shaft end portion, said cylindrical axially extending bore having a transverse shoulder and an enlarged portion housing said threaded free end portion of said shaft; an annular supporting member located in said enlarged portion of said bore and being fixedly mounted about said shaft for rotation therewith, said supporting member having a pair of annular faces, one of said annular faces abutting against said transverse shoulder; a nut located in said enlarged portion of said bore, being screwed onto said threaded free end portion of said shaft and slidably engaging the other annular face of said supporting member so as to prevent movement of said coupling parts in axial direction away from each other; an annular coupling member mounted on the outer surface of said second coupling part slidably in axial direction but non-rotatable relative thereto, said annular coupling member having a rim projecting into said annular recess of said first coupling part and being formed with recesses; and spring means mounted on said second coupling part engaging said coupling member and urging the same in axial direction toward said annular face of said first coupling part so that said recesses in said rim embrace said rollers and connect said coupling part for rotation, while said coupling rollers urge said coupling member in an opposite axial direction when the transmitted torque exceeds a predetermined limit whereby said coupling parts are disconnected for relative rotation.

References Cited in the file of this patent

UNITED STATES PATENTS

| | | |
|---|---|---|
| 1,518,634 | Cason | Dec. 9, 1924 |
| 1,657,274 | Niedhammer | Jan. 24, 1928 |
| 2,432,633 | Sirp | Dec. 16, 1947 |
| 2,523,584 | Miller | Sept. 26, 1950 |
| 2,561,136 | Richardson | July 17, 1951 |

FOREIGN PATENTS

| | | |
|---|---|---|
| 110,543 | Switzerland | 1925 |
| 89,743 | Sweden | 1937 |